United States Patent
Schulte-Coerne et al.

(10) Patent No.: US 10,144,303 B2
(45) Date of Patent: Dec. 4, 2018

(54) MONITORING DEVICE FOR A VEHICLE AND METHOD FOR MONITORING A VEHICLE

(71) Applicant: Robert Bosch GmbH, Stuttgart (DE)

(72) Inventors: Vincent Schulte-Coerne, Beilstein (DE); Jose-Luis Parga-Cacheiro, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 14/783,145

(22) PCT Filed: Mar. 14, 2014

(86) PCT No.: PCT/EP2014/055150
§ 371 (c)(1),
(2) Date: Oct. 8, 2015

(87) PCT Pub. No.: WO2014/166698
PCT Pub. Date: Oct. 16, 2014

(65) Prior Publication Data
US 2016/0075252 A1   Mar. 17, 2016

(30) Foreign Application Priority Data
Apr. 12, 2013 (DE) .................. 10 2013 206 611

(51) Int. Cl.
*B60L 3/00* (2006.01)
*B60L 11/18* (2006.01)
*B60R 25/10* (2013.01)

(52) U.S. Cl.
CPC ......... *B60L 11/1851* (2013.01); *B60L 3/0038* (2013.01); *B60L 11/1809* (2013.01);
(Continued)

(58) Field of Classification Search
CPC .... B60R 25/10; B60L 3/0038; B60L 11/1859; B60L 11/1809; B60L 11/1851;
(Continued)

(56) References Cited

U.S. PATENT DOCUMENTS 5,757,150 A * 5/1998 Kinoshita ............. B60L 3/0007
                                                        200/61.08
9,511,671 B2 * 12/2016 Yamamoto ................ B60T 7/12
(Continued)

FOREIGN PATENT DOCUMENTS

DE       10212483       10/2003
DE     102005018487    10/2006
(Continued)

OTHER PUBLICATIONS

International Search Report for Application No. PCT/EP2014/055150 dated Feb. 16, 2015 (English Translation, 3 pages).
(Continued)

*Primary Examiner* — Stephen Holwerda
(74) *Attorney, Agent, or Firm* — Michael Best & Friedrich LLP

(57) ABSTRACT

Methods and systems for monitoring a vehicle. In a parked state of the vehicle, the control unit of the vehicle is deactivated, and the signals of some of the sensors of the vehicle are detected and evaluated by way of a separate detecting unit. If, based on the sensor signals evaluated in this way, a defined event is detected, the previously deactivated control unit can be activated. Thus, the operating time of the control unit is minimized over the total life span of the vehicle.

15 Claims, 2 Drawing Sheets

(52) U.S. Cl.
CPC .......... *B60L 11/1859* (2013.01); *B60R 25/10* (2013.01); *B60L 2240/28* (2013.01); *B60L 2240/46* (2013.01); *B60L 2240/545* (2013.01); *B60L 2240/60* (2013.01); *B60L 2270/30* (2013.01); *Y02T 10/7005* (2013.01); *Y02T 10/705* (2013.01); *Y02T 10/7291* (2013.01); *Y02T 90/161* (2013.01)

(58) Field of Classification Search
CPC ............. B60L 2270/30; B60L 2240/28; B60L 2240/545; B60L 2240/60; B60L 2240/46; Y02T 10/7005; Y02T 10/705; Y02T 90/161; Y02T 10/7291
See application file for complete search history.

(56) References Cited

U.S. PATENT DOCUMENTS

| | | | | |
|---|---|---|---|---|
| 2008/0275600 | A1* | 11/2008 | Rask | B60K 6/24 701/22 |
| 2009/0001926 | A1* | 1/2009 | Sato | B60L 3/0046 320/102 |
| 2009/0057041 | A1* | 3/2009 | Kamaga | B60L 11/1816 180/65.245 |
| 2010/0072946 | A1* | 3/2010 | Sugano | B60L 3/0046 320/108 |
| 2010/0181827 | A1 | 7/2010 | Cunningham et al. | |
| 2010/0256851 | A1* | 10/2010 | Mitsutani | B60W 10/06 701/22 |
| 2010/0320018 | A1* | 12/2010 | Gwozdek | B60T 17/18 180/65.27 |
| 2011/0022256 | A1* | 1/2011 | Asada | B60L 11/1824 701/22 |
| 2011/0089953 | A1 | 4/2011 | Chandler et al. | |
| 2011/0178663 | A1* | 7/2011 | Crombez | B60K 28/10 701/22 |
| 2011/0187184 | A1* | 8/2011 | Ichikawa | B60L 1/003 307/10.1 |
| 2011/0196545 | A1* | 8/2011 | Miwa | B60K 6/365 700/292 |
| 2011/0221400 | A1* | 9/2011 | Takizawa | B60L 11/1816 320/166 |
| 2011/0227714 | A1* | 9/2011 | Kamaga | B60W 20/15 340/438 |

FOREIGN PATENT DOCUMENTS

| | | |
|---|---|---|
| DE | 102010002154 A1* | 8/2011 |
| JP | 2011120346 | 6/2011 |
| KR | 20040107294 | 12/2004 |
| KR | 20130026753 | 3/2013 |

OTHER PUBLICATIONS

Elend et al., "Partial networking for conventional and electric vehicles," Can Newsletter, Jan. 31, 2012, pp. 76-78.

\* cited by examiner

MONITORING DEVICE FOR A VEHICLE AND METHOD FOR MONITORING A VEHICLE

FIELD

The invention relates to a monitoring device for a vehicle and to a method for monitoring a vehicle.

BACKGROUND

Modern motor vehicles are normally monitored and controlled by an electronic controller. Controllers of this type control the correct functioning of the vehicle and its components and furthermore are able to intervene to correct dangerous situations. In the case of conventional motor vehicles with an internal combustion engine, the controllers are active during operation of the vehicle and, after the vehicle is parked, can be switched off immediately or after a possible short run-on time.

Electric vehicles which can be driven either fully or at least partially (hybrid vehicles) by means of electrical energy from a rechargeable battery (traction battery) are also known. In the case of electric vehicles of this kind, it is generally necessary to connect the rechargeable battery of the vehicle to an energy source and to charge the battery by means of an external connection. A charging system of this kind for charging an energy storage means in a vehicle is known, for example, from DE 10 2010 002 154 A1.

During charging of the traction batteries of the electric vehicle, at least the electronics of the vehicle cannot be fully switched off. By way of example, it is necessary to ensure that the vehicle does not roll away during charging of the traction battery. Otherwise, there is a risk of a charging cable by means of which the vehicle is supplied with electrical energy possibly being ripped off in an uncontrolled manner. In the event of uncontrolled ripping off of this kind in the supply line, there is a risk of an electrical short circuit with far-reaching consequences. In order to preclude this, the possibility of the vehicle rolling away during charging of the traction battery has to be identified and corresponding countermeasures have to be initiated if required. To this end, it is necessary for, in particular, the controller of the vehicle to remain active even during the charging process of the traction battery. Therefore, the controller can collect information from various sensors of the vehicle, evaluate said information and draw conclusions about a possible movement of the vehicle from said information in order to initiate the necessary countermeasures if required.

Since charging of the fraction batteries takes place over a relatively long period of time in the case of electric vehicles, the controller also has to be operated in an active state over this long period of time. In the process, the charging time of the batteries can easily amount to up to five times the actual driving time of the vehicle. This results in a very long operating period of the controller with respect to the overall service life of the vehicle. In order to prevent premature breakdown or failure of the controller, it is therefore necessary to use particularly high-quality components for constructing the controller. Furthermore, particularly complicated tests for ensuring the required quality of controllers of this kind are also necessary. This leads to very high costs for controllers of this kind. Furthermore, the relatively long operation of the controllers during charging of the traction batteries also leads to a correspondingly high level of energy consumption by the controller. Since, in many cases, the controller is fed by a separate low-voltage battery of the vehicle which is not included in the charging process of the traction battery, said low-voltage battery may also be subject to above-average usage.

There is therefore a need for an advantageous monitoring device for a vehicle, which monitoring device has a low probability of breakdown over a long service life and, in the process, can be realized in a cost-effective manner at the same time. There is also a need for a monitoring device for a vehicle, which monitoring device has as low a level of energy consumption as possible.

SUMMARY OF THE INVENTION

According to one aspect, the present invention provides a monitoring device for a vehicle, having a detector device which is designed to evaluate a sensor signal from at least one sensor and to identify a predetermined event on the basis of the evaluated sensor signal; a control device; and an activation device which is designed to deactivate the control device during the evaluation of the sensor signal by the detector device, and to activate the control device when the detector device has identified a predetermined event.

According to a further aspect, the present invention provides a method for monitoring a vehicle, comprising the steps of deactivating a control device of the vehicle; detecting a sensor signal; identifying a predetermined event on the basis of the detected sensor signal; and activating the control device of the vehicle when a predetermined event has been identified.

One idea of the present invention is to realize monitoring of the vehicle using a minimum number of involved elements and furthermore to deactivate all of the elements which are not absolutely necessary for as long as possible. To this end, the sensor/sensors is/are monitored only by means of a special detector device. Therefore, it is also necessary for only this detector device to remain permanently active during the monitoring process. The relatively complex and expensive controller of the vehicle can initially be deactivated during this phase and is moved to the active state by the activation device only when a particular event is identified.

One advantage of the invention is that the control device of the vehicle with its complex circuit structure therefore has to be designed only for the active driving time of the vehicle. Since the control device is first deactivated during monitoring of the sensors, the active operating time over the service life of the vehicle therefore drops. The circuits for the control device can therefore be constructed using significantly less expensive components and the required tests for quality assurance of control devices of this kind can also be made significantly simpler and less expensive.

A further advantage is that the controller requires virtually no energy in its inactive phase. Only the detector device which is considerably simpler in comparison to the control device and therefore also consumes less energy is permanently active. Therefore, the monitoring device according to the invention has a considerably lower energy requirement.

According to one embodiment of the monitoring device according to the invention, the detector device evaluates a plurality of sensor signals. In particular, this plurality of sensor signals can originate from a plurality of sensors. Particularly reliable information about the state of the vehicle can be obtained by using a plurality of sensor signals from a plurality of sensors.

In a special embodiment of the monitoring device according to the invention, the plurality of sensor signals are evaluated in a cyclically alternating manner. Owing to cyclically alternating evaluation of the sensor signals in this way, the detector device has to evaluate in each case only the signal from one sensor and can therefore be kept particularly simple. Furthermore, in the case of this cyclically alternating operation of the sensors, also in each case only one of the many sensors is active, while the remaining sensors can be moved to an inactive state. Therefore, the operating period of the sensors used also drops with respect to the overall service life. Therefore, the sensors can also be designed for a shorter overall operating period, this allowing less expensive sensors to be used.

According to a further embodiment, the monitoring device according to the invention further comprises a diagnosis device which is designed to monitor the functioning of the at least one sensor. By diagnosing the sensors used during the monitoring operation, a malfunction of one or more sensors can be quickly and reliably identified and suitable countermeasures can then be initiated.

In a special embodiment of the monitoring device according to the invention, the activation device activates the control device when the diagnosis device identifies a malfunction of at least one sensor. By activating the entire control device when a malfunction of a sensor occurs, the control device can then carry out complete analysis of the vehicle system and from this diagnose precise possible causes of the faults and possibly also initiate suitable countermeasures.

One embodiment of the present invention comprises a vehicle having a monitoring device according to the invention. A particularly high degree of reliability of the components used over a large number of years is required particularly in the automotive field. Therefore, a monitoring device can be realized in a relatively low-cost manner by using the monitoring device according to the invention, said monitoring device also having only a low probability of breakdown over a very long service life.

According to one embodiment, the vehicle comprises a rechargeable electrical energy storage means, and the monitoring device monitors the vehicle during charging of the electrical energy storage means. The charging process of an electrical energy storage means of an electric vehicle is generally considerably longer than the pure driving time of the vehicle. Since the monitoring device according to the invention requires only a relatively low number of active components during charging, most of the components, in particular the control device of the vehicle, can be designed for the relatively short operating time during the driving mode of the vehicle.

In one particular embodiment, the detector device identifies a movement of the vehicle on the basis of the evaluated sensor signal. Since a movement is not a normal operating state specifically when vehicles are parked, it is particularly important in cases of this kind to initiate countermeasures quickly in order to bring the vehicle to a stop again.

In a further embodiment, the detector device identifies a manipulation of the vehicle on the basis of the evaluated sensor signal. A manipulation of this kind, for example an attempt to steal the vehicle or damage to the vehicle, can then be indicated by activating the control device and by a suitable reaction rapidly to the surroundings.

BRIEF DESCRIPTION OF THE DRAWINGS

Further features and advantages of embodiments of the invention can be gathered from the following description with reference to the appended drawings.

In the drawings.

DETAILED DESCRIPTION

The drawings illustrated in the figures are, in part, perspective illustrations of elements which are not necessarily depicted true-to-scale for reasons of clarity. Identical reference symbols denote components which are generally the same or act in the same way.

Figure 1:
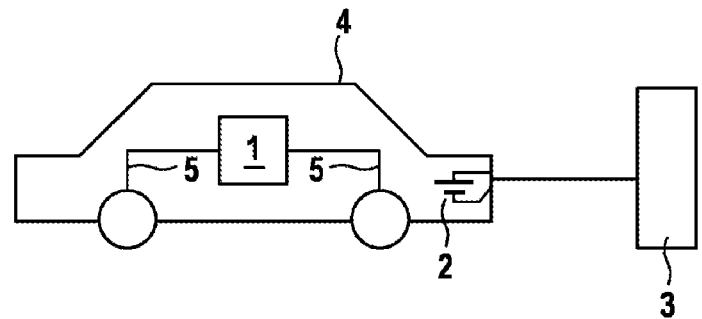
FIG. 1: shows a schematic illustration of a vehicle having a monitoring device according to one embodiment of the invention.

FIG. 1 shows a vehicle 4 having a monitoring device 1 according to one embodiment of the present invention. In this case, the vehicle 4 comprises an electrical energy storage means 2, for example a rechargeable traction battery. This electrical energy storage means 2 is supplied with energy and charged by a charging station 3. To this end, the charging station 3 is connected to the vehicle 4 by means of a cable connection. If the vehicle 4 were moved away from the charging station 3 during charging of the energy storage means 2, the cable connection between the charging station 3 and the vehicle 4 would rip off, and there is a risk of a short circuit with far-reaching consequences.

The vehicle 4 further comprises a plurality of sensors 5 which send corresponding sensor signals to the monitoring device 1. Sensors of this kind are, for example, rotation speed sensors on the wheels of the vehicle, acceleration sensors, rotation speed sensors in gear mechanisms, rotation speed and rotor position sensors in electric motors for driving the vehicle, sensors for monitoring the tire pressure, a GPS receiver, an electronic compass, an inclination sensor etc. Further sensors are likewise possible.

Figure 2:
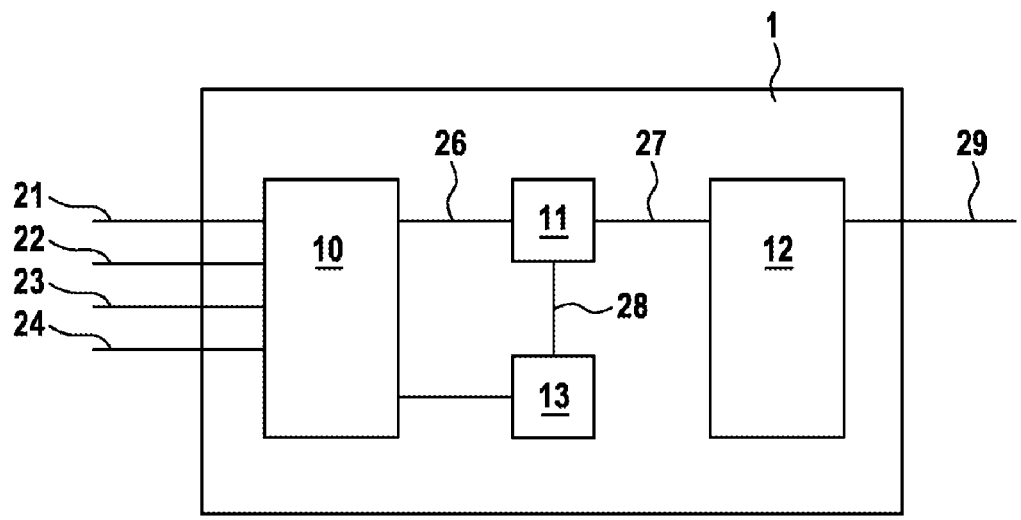
FIG. 2 shows a schematic illustration of a monitoring device according to a further embodiment of the invention.

FIG. 2 shows a schematic illustration of a monitoring device 1 according to one embodiment of the invention. In this case, the monitoring device 1 comprises a detector device 10, an activation device 11, a control device 12 and a diagnosis device 13. In the normal driving mode, the monitoring device 1 is fully active in this case. In particular, the control device 12 is fully active in the normal driving mode in order to monitor and to control the processes within the vehicle. In this case, the control device 12 can be, for example, a controller of the vehicle, for example a controller for electronic stability control (ESC), for controlling a gear mechanism, for controlling electric motors, for monitoring the tire pressure or for navigation.

In the parked state of the vehicle however, the control device 12 is not active. The control device 12 does not require any energy or at least virtually no energy in this deactivated state. Furthermore, the control device 12 does not execute any functions at all in this state.

In this parked state of the vehicle, one or more sensors within the vehicle are monitored by the detector device 10. To this end, the detector device 10 receives one or more sensor signals 21-24 and evaluates said sensor signals. The detector device 10 can draw conclusions about the state of the vehicle and possibly identify a predetermined event on the basis of the evaluated sensor signals. For example, the detector device 10 can identify a movement of the vehicle 4 on the basis of a sensor signal of a rotation speed sensor or the like. As an alternative, it is also feasible to fit a temperature sensor to the battery 2 of the vehicle in order to identify excessive heating of the battery 2 at an early stage. The identification of other events, such as the opening of a door, excessive vibration of the vehicle or else a specific voltage being overshot or undershot within the vehicle, can likewise be monitored, evaluated and identified.

If the detector device 10 identifies a particular event of this kind, the detector device 10 indicates this event to the activation device 11 via the signal line 26. The activation device 11 then moves the control device 12 to an active state via the signal line 27. In this active state, the control device 12 can again acquire full control over the vehicle. Therefore, the control device 12 can firstly fully detect and evaluate the current state of the vehicle. Furthermore, the control device 12 is also able to actively actuate one or more components of the vehicle in this active state. Therefore, for example in the event of an unexpected movement of the vehicle 4, a braking process can be initiated by outputting a suitable control signal 29. Therefore, an active braking process can be initiated when a vehicle movement is detected for example during charging of the traction battery 2 in order to prevent the vehicle from rolling away and therefore to prevent damage to the charging cable. In addition or as an alternative, it is furthermore also possible to output optical and/or acoustic warning signals in order to alert the vehicle driver to the detected event. Further measures are likewise possible, depending on the events to be detected. For example, when vibration is detected, it is possible to draw the conclusion that the parked vehicle may have been involved in a collision or accident. In a case of this kind, it may be appropriate to disconnect the energy storage means 2 from the on-board electrical system by way of the control device 12, in order to reduce the risk of short circuits in a damaged vehicle. A further option is, for example, to monitor the temperature of the energy storage means 2 during the charging process and to interrupt or to at least restrict the charging process in the event of an impermissible increase in temperature.

Furthermore, the tire pressure, for example, can also be monitored and it is possible to draw the conclusion that a manipulation or sabotage attempt has been made in the event of a surprising pressure drop in the tire pressure. An optical and/or acoustic warning signal can then be output for example.

In this case, the detector device 10 can also evaluate the signals from a plurality of sensors. In this case, it is possible, for example, for the sensor signals from all sensors to be supplied to the detector device 10 and evaluated at the same time. As an alternative, the detector device 10 can also evaluate said sensor signals sequentially one after another. If the vehicle 4 has, for example, a separate rotation speed sensor on each of the four wheels, it is sufficient to monitor in each case only one rotation speed sensor in order to detect a vehicle movement. In order to subject all of the rotation speed sensors of the four wheels to uniform use, the detector device 10 can monitor one sensor in each case in a cyclically alternating manner and, after a predetermined time period, deactivate this sensor and activate a further sensor. Therefore, only one of four rotation speed sensors is active in each case and the remaining three rotation speed sensors are inactive in the process. The active operating time of the rotation speed sensors is also considerably reduced in this way. Therefore, the individual sensors each have to be designed only for a relatively short maximum operating period.

In particular, when, as just described above, only one of a plurality of redundant sensors is actively evaluated, it is very important to identify a possible malfunction of the sensors at an early stage. To this end, the monitoring device 1 can be equipped with a diagnosis device 13 which monitors the functioning of the connected sensors. In this case, at least the functioning of the respectively active connected sensors is monitored. To this end, it is possible, for example, to monitor at least the current path from and to the sensor in order to draw any conclusions about a possible interruption at an early stage. In addition or as an alternative, the functionality of the connected sensor can also be checked continuously or at intervals by the diagnosis device 13. In a special embodiment, the connected sensors can in this case have an internal fault analysis device which then sends the result of the internal fault monitoring to the diagnosis device 13.

If a malfunction of a connected sensor is identified by the diagnosis device 13, it is firstly possible for this sensor to not be further evaluated by the detector device 10 during the further monitoring. In addition or as an alternative, when a malfunction of a sensor is detected, it is also possible for the diagnosis device 13 to forward this event to the activation device 11 via the signal line 28 and for the activation device 11 to then move the control device 12 to an active state. The control device 12 can then carry out a complete and detailed analysis of the vehicle state, in particular of the sensors which have been diagnosed as faulty. The corresponding result can be displayed in the vehicle and is also immediately available at a later time, for example when a user wishes to start the vehicle. The user will therefore be informed of the malfunction which had previously occurred immediately upon starting the vehicle and can initiate suitable measures.

In order to realize the monitoring device according to the invention in a particularly efficient manner, the assemblies which are also active when a vehicle is parked can be combined in a suitable component, for example an integrated electrical circuit, in this case. For example, the detector device 10, the activation device 11 and, if required, also the diagnosis device 13 can be combined in a component of this kind. Therefore, only this single assembly has to be designed for an increased operating period during the service life of the vehicle, while the other assemblies, in particular the control device 12, only have to be designed for a short operating period during the service life of the vehicle. As an alternative, it is also possible to divide the functions of the detector device 10, of the activation device 12 and possibly of the diagnosis device 13 between a plurality of assemblies and to configure these assemblies for the relatively long total operating period which is to be expected.

Figure 3:
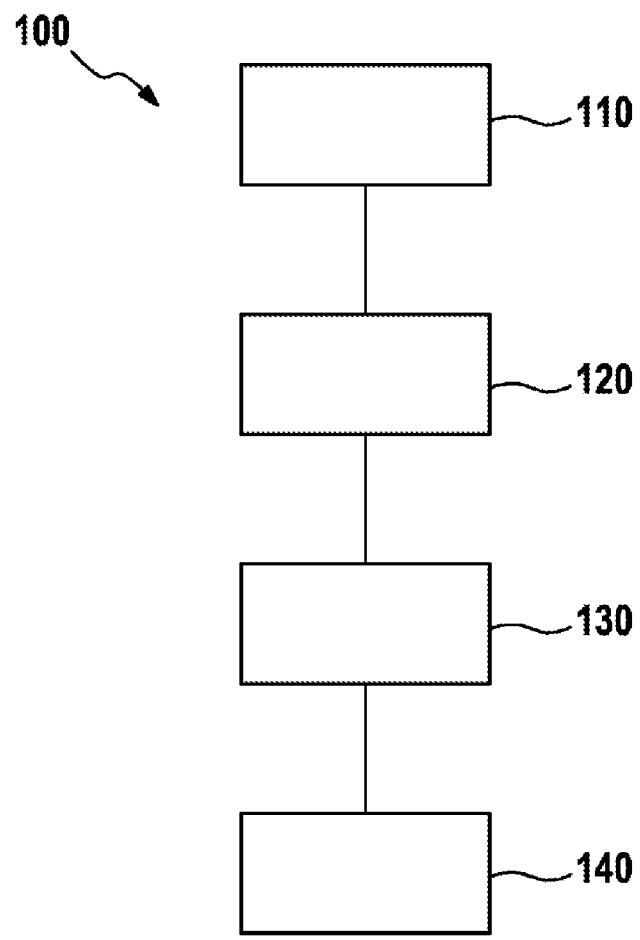
FIG. 3 shows a schematic illustration of a method for monitoring a vehicle according to one embodiment of the invention.

FIG. 3 shows a schematic illustration of a method 100 according to the invention for monitoring a vehicle. After the vehicle has been parked and switched off, the control device 12 of the vehicle is deactivated in the next step 110. In this state, the control device 12 does not require any energy supply or at least virtually no energy supply. As long as the control device 12 is deactivated, one or more sensor signals 21-24 are detected and evaluated by means of the detector device 10 in a step 120. As described above, a plurality of sensors, for example a plurality of redundant sensors, can be activated in a cyclically alternating manner and evaluated in this case. A predetermined event is then identified in step 130. A predetermined event of this kind may be, for example, a signal from a sensor, for example a movement of a wheel sensor or the like.

After a predetermined event has been identified, the control device of the vehicle is activated in step 140. The control device 12 together with all of the functions is then available for diagnosis and for initiating any necessary countermeasures.

In addition, the functioning of the connected sensors and the reliability of the supplied sensor signals can also be monitored in a further step, not illustrated. When a malfunction of a sensor occurs, the control device 12 can then likewise be activated. The control device 12 can then carry out a detailed diagnosis of the vehicle state and of the sensor which has been classified as defective and, if necessary, activate further measures, such as display in the vehicle for example.

In summary, the present invention relates to a monitoring device for a vehicle. In the parked state of the vehicle, the control device of the vehicle is deactivated and the signals from some sensors of the vehicle are detected and evaluated by means of a separate detector device. If a predetermined event is detected on the basis of the sensor signals which are evaluated in this way, the previously deactivated control device can be activated. Therefore, the operating time of the control device with respect to the entire service life of the vehicle is minimized.

The invention claimed is:

1. A monitoring device for a vehicle, the monitoring device comprising:
a detector device configured to evaluate a plurality of sensor signals from at least one sensor and to identify a predetermined event on the basis of at least one of the plurality of evaluated sensor signals;
an electronic controller for a vehicle; and
an activation device configured to deactivate the electronic controller during the evaluation of the plurality of sensor signals by the detector device and to activate the electronic controller when the detector device has identified the predetermined event,
wherein, when the electronic controller is activated, the electronic controller generates a control signal for initiating a countermeasure to the predetermined event, and
wherein the detector device evaluates the plurality of sensor signals in a cyclically alternating manner to individually identify a malfunction of at least one selected from a group consisting of a first sensor and a second sensor, wherein the detector device evaluates the plurality of sensor signals in a cyclically alternating manner by activating the first sensor and deactivating the second sensor and, after a predetermined time, deactivating the first sensor and activating the second sensor.

2. The monitoring device as claimed in claim 1, further comprising a diagnosis device configured to monitor the function of the at least one sensor.

3. The monitoring device as claimed in claim 2, wherein the activation device activates the electronic controller when the diagnosis device has identified a malfunction of the at least one sensor.

4. The monitoring device as claimed in claim 1, wherein the predetermined event is an abnormal operating state of the vehicle, wherein the abnormal operating state of the vehicle includes at least one selected from a group consisting of an impermissible increase in temperature of an energy storage device, a vibration indicative of a potential vehicle collision, and a pressure drop in a tire pressure.

5. The monitoring device as claimed in claim 1, wherein the predetermined event includes an unexpected movement of the vehicle and the countermeasure to the predetermined event includes initiating a braking process.

6. The monitoring device as claimed in claim 1, wherein the plurality of sensor signals includes at least one selected from a group consisting of a temperature, a tire pressure, and a vibration.

7. The monitoring device as claimed in claim 1, wherein the plurality of sensor signals includes a vibration of the vehicle indicative of a potential vehicle collision.

8. The monitoring device as claimed in claim 7, wherein the predetermined event includes a potential vehicle collision involving the vehicle and the countermeasure to the predetermined event includes disconnecting an energy storage means from an on-board electrical system by way of the control device.

9. The monitoring device as claimed in claim 1, wherein the plurality of sensor signals includes a temperature of an energy storage means during a charging process.

10. The monitoring device as claimed in claim 9, wherein the predetermined event includes an impermissible increase in temperature and the countermeasure to the predetermined event includes interrupting the charging process.

11. A vehicle having a monitoring device comprising:
a detector device configured to evaluate a plurality of sensor signals from at least one sensor and to identify a predetermined event on the basis of at least one of the plurality of evaluated sensor signals;
an electronic controller; and
an activation device configured to deactivate the electronic controller during the evaluation of the plurality of sensor signals by the detector device and to activate the electronic controller when the detector device has identified the predetermined event,
wherein, when the electronic controller is activated, the electronic controller generates a control signal for initiating a countermeasure to the predetermined event, and
wherein the detector device evaluates the plurality of sensor signals in a cyclically alternating manner to individually identify a malfunction of at least one selected from a group consisting of a first sensor and a second sensor, wherein the detector device evaluates the plurality of sensor signals in a cyclically alternating manner by activating the first sensor and deactivating the second sensor and, after a predetermined time, deactivating the first sensor and activating the second sensor.

12. The vehicle as claimed in claim 11, wherein the vehicle further comprises a chargeable battery and wherein the monitoring device monitors the vehicle during the charging of the battery.

13. The vehicle as claimed in claim 11, wherein the detector device identifies a movement of the vehicle on the basis of at least one of the plurality of evaluated sensor signals.

14. The vehicle as claimed in claim 11, wherein the detector device identifies a manipulation of the vehicle on the basis of at least one of the plurality of evaluated sensor signals, wherein the manipulation of the vehicle includes at least one selected from a group consisting of an attempt to steal the vehicle or an attempt to damage the vehicle.

15. A method for monitoring a vehicle, the method comprising the steps of:
deactivating an electronic controller of the vehicle;
detecting a plurality of sensor signals in a cyclically alternating manner to individually identify a malfunction of at least one selected from a group consisting of a first sensor and a second sensor, wherein a detector device evaluates the plurality of sensor signals in a cyclically alternating manner by activating the first sensor and deactivating the second sensor and, after a predetermined period of time, deactivating the first sensor and activating the second sensor;

identifying a predetermined event on the basis of at least one of the plurality of detected sensor signals;

activating the control device of the vehicle when the predetermined event has been identified; and generating a control signal for initiating a countermeasure to the predetermined event.

* * * * *